United States Patent
Benoit et al.

(10) Patent No.: US 12,271,080 B2
(45) Date of Patent: Apr. 8, 2025

(54) OPTICAL FILM, BACKLIGHT AND DISPLAY SYSTEM

(71) Applicant: 3M INNOVATIVE PROPERTIES COMPANY, St. Paul, MN (US)

(72) Inventors: Gilles J. Benoit, Minneapolis, MN (US); Lin Zhao, Woodbury, MN (US); Matthew B. Johnson, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/715,302

(22) PCT Filed: Dec. 2, 2022

(86) PCT No.: PCT/IB2022/061722
§ 371 (c)(1),
(2) Date: May 31, 2024

(87) PCT Pub. No.: WO2023/111761
PCT Pub. Date: Jun. 22, 2023

(65) Prior Publication Data
US 2025/0044644 A1    Feb. 6, 2025

Related U.S. Application Data

(60) Provisional application No. 63/290,253, filed on Dec. 16, 2021.

(51) Int. Cl.
*G02F 1/00* (2006.01)
*G02F 1/1335* (2006.01)
*G02F 1/13357* (2006.01)

(52) U.S. Cl.
CPC .. *G02F 1/133614* (2021.01); *G02F 1/133605* (2013.01); *G02F 1/133607* (2021.01)

(58) Field of Classification Search
None
See application file for complete search history.

(56) References Cited

U.S. PATENT DOCUMENTS

| | | |
|---|---|---|
| 5,440,446 A | 8/1995 | Shaw et al. |
| 5,877,895 A | 3/1999 | Shaw et al. |

(Continued)

FOREIGN PATENT DOCUMENTS

| | | |
|---|---|---|
| CN | 108508654 A | 9/2018 |
| CN | 109378394 A | 2/2019 |

(Continued)

OTHER PUBLICATIONS

International Search report for PCT International Application No. PCT/IB2022/061722, mailed on Feb. 21, 2023, 4 pages.

*Primary Examiner* — Gerald J Sufleta, II
(74) *Attorney, Agent, or Firm* — Clifton F. Richardson (57) ABSTRACT

An optical film includes a plurality of first layers disposed on a plurality of polymeric second layers. Each of at least 30% of the first layers includes at least 30% by weight of an inorganic material. For a substantially normally incident light, a blue wavelength range extending from about 420 mn to about 480 m, a green wavelength range extending from about 490 nm to about 560 in, and a red wavelength range extending from about 590 nm to about 670 nm, the optical film and the plurality of second layers have respective average optical reflectances Rof(b) and R2(b) in the blue wavelength range, Rof(g) and R2(g) in the green wavelength range, and Rof(r) and R2(r) in the red wavelength range, where 0≤Rof(b)−R2(b)≤25%; Rof(g)−R2(g)>30%; and each of Rof(r) and R2(r) is greater than about 60% and |Rof(r)−R2(r)| is less than about 20%.

15 Claims, 5 Drawing Sheets

(56) References Cited

U.S. PATENT DOCUMENTS

| | | | |
|---|---|---|---|
| 5,882,774 | A | 3/1999 | Jonza et al. |
| 5,932,626 | A | 8/1999 | Fong et al. |
| 6,010,751 | A | 1/2000 | Shaw et al. |
| 6,280,063 | B1 | 8/2001 | Fong et al. |
| 6,413,645 | B1 | 7/2002 | Graff et al. |
| 6,783,349 | B2 | 8/2004 | Neavin et al. |
| 6,949,212 | B2 | 9/2005 | Merrill et al. |
| 6,967,778 | B1 | 11/2005 | Wheatley et al. |
| 7,018,713 | B2 | 3/2006 | Padiyath et al. |
| 7,622,164 | B2 | 11/2009 | Jones et al. |
| 9,162,406 | B2 | 10/2015 | Neavin et al. |
| 9,423,553 | B2 | 8/2016 | Saito |
| 9,997,657 | B2 | 6/2018 | Weigel et al. |
| 10,636,920 | B2 | 4/2020 | Spagnola et al. |
| 10,677,975 | B2 * | 6/2020 | Kuroda .................. H05B 33/02 |
| 10,890,704 | B2 * | 1/2021 | Kuroda ............... G02F 1/13363 |
| 2016/0349573 | A1 * | 12/2016 | Ohmuro ................ G02F 1/1336 |
| 2019/0346113 | A1 | 11/2019 | Zhang et al. |
| 2020/0264461 | A1 * | 8/2020 | Kuwana ................ G02F 1/1336 |
| 2020/0341267 | A1 * | 10/2020 | Wong ................ G02B 27/005 |
| 2020/0386931 | A1 * | 12/2020 | Johnson ............... G02B 5/0816 |
| 2020/0387003 | A1 * | 12/2020 | Yun ....................... G02B 27/285 |
| 2021/0296543 | A1 | 9/2021 | Aoyama et al. |

FOREIGN PATENT DOCUMENTS

| | | | |
|---|---|---|---|
| JP | 2010096955 | A | 4/2010 |
| JP | 2014081526 | A | 5/2014 |
| JP | 2014142367 | A | 8/2014 |

* cited by examiner

OPTICAL FILM, BACKLIGHT AND DISPLAY SYSTEM

CROSS REFERENCE TO RELATED APPLICATIONS

This application is a national stage filing under 35 U.S.C. 371 of PCT/IB2022/061722, filed Dec. 2, 2022, which claims the benefit of U.S. Application No. 63/290,253, filed Dec. 16, 2021, the disclosures of which are incorporated by reference in their entireties herein.

SUMMARY

In some aspects, the present description provides a multilayer optical film including a plurality of first layers numbering N1 in total disposed on, and substantially coextensive in length and width with, a plurality of polymeric second layers numbering N2 in total, where 2<N1<50, N2-N1>10. Each of the first and second layers can have an average thickness of less than about 500 nm. Each of at least 30% of the first layers includes at least 30% by weight of an inorganic material, such that for a substantially normally incident light, a blue wavelength range extending from about 420 nm to about 480 nm, a green wavelength range extending from about 490 nm to about 560 nm, and a red wavelength range extending from about 590 nm to about 670 nm, the optical film and the plurality of polymeric second layers have respective average optical reflectances Rof(b) and R2(b) in the blue wavelength range, Rof(g) and R2(g) in the green wavelength range, and Rof(r) and R2(r) in the red wavelength range. In some embodiments, 0≤Rof(b)−R2(b)≤25%; Rof(g)−R2(g)>30%; and each of Rof(r) and R2(r) is greater than about 60% and a magnitude of a difference between Rof(r) and R2(r) is less than about 20%.

In some aspects, the present description provides an optical stack including one or more light converting films having a blue emission spectrum including at least one blue peak at a corresponding blue wavelength, a green emission spectrum including at least one green peak at a corresponding green wavelength, and a red emission spectrum including at least one red peak at a corresponding red wavelength. The optical stack includes an optical film disposed on, and substantially coextensive in length and width with, the one or more light converting films. The optical film includes a plurality of inorganic first layers numbering at least 3 in total and a plurality polymeric second layers numbering at least 20 in total, each of the inorganic first and the polymeric second layers having an average thickness of less than about 500 nm, such that for a substantially unpolarized substantially normally incident light, the optical film has an optical transmittance of greater than about 60% at the blue wavelength and an optical reflectance of greater than about 70% at each of the green and red wavelengths.

In some aspects, the present description provides an optical film including a plurality of layers numbering less than about 600 in total, the plurality of layers comprising a plurality of first layers numbering between 3 and 50 in total disposed on a plurality polymeric second layers numbering at least 20 in total, where each of at least 30% of the first layers comprise at least 30% by weight of an inorganic material and each of the first and the polymeric second layers having an average thickness of less than about 500 nm, such that for a substantially unpolarized substantially normally incident light: an optical reflectance of the polymeric second layers versus wavelength has a first reflection band including a first full width at half maximum FWHM1 that is at least 100 nm wide and includes at least one wavelength in a red wavelength range extending from about 590 nm to about 670 nm, but no wavelengths in a green wavelength range extending from about 490 nm to about 560 nm. The plurality of first layers extends the FWHM1 so that the optical film has a second reflection band having a second full width at half maximum FWHM2 greater than FWHM1 by at least 20 nm and including at least one wavelength in the green wavelength range. The optical film and the plurality of second layers have respective average optical reflectances Rof(r) and R2(r) in the red wavelength range, where a magnitude of a difference between Rof(r) and R2(r) can be less than about 3%.

In some aspects, the present description provides an optical film including a plurality of first layers numbering between 3 and 50 in total disposed on a plurality alternating polymeric second and polymeric third layers numbering at least 20 in total. Each of at least 30% of the first layers comprise at least 30% by weight of an inorganic material and each of the polymeric second layers can have at least 80% by weight of polyethylene terephthalate. Each of the first, second and third layers has an average thickness of less than about 500 nm, such that for a substantially unpolarized substantially normally incident light: optical reflectances of the optical film, the plurality of first layers, and the plurality of alternating polymeric second and polymeric third layers have respective first, second, and third reflection bands including respective first, second, and third full width at half maxima that extend between respective smaller wavelengths and respective larger wavelengths. Each of the first, second, and third full width at half maxima can be at least 50 nm wide. A magnitude of a difference between the smaller wavelengths of the first and third full width at half maxima can be less than about 20 nm. The smaller wavelength of the third full width at half maxima can be less than the smaller wavelength of the second full width at half maxima by at least 20 nm. The larger wavelength of the first full width at half maxima can be greater than the larger wavelength of the second full width at half maxima by at least 5 nm.

In some aspects, the present description provides a backlight for providing illumination to a display panel configured to display an image. The backlight includes a plurality of light emitting elements arranged two-dimensionally and spaced apart from each other and configured to emit light having an emitted wavelength; one or more light converting films disposed on the light emitting elements and having first, second and third emission spectra including respective first, second and third peaks at corresponding respective first, second and third peak wavelengths and corresponding non-overlapping first, second, and third full width at half maxima (FWHMs), where the second FWHM disposed between the first and third FWHM. The one or more light converting films is configured to receive the emitted light from the light emitting elements and convert at least portions of the received emitted light to second and third lights having respective second and third wavelengths disposed in the respective second and third FWHMs. The backlight includes an optical film disposed between the light emitting elements and the one or more light converting films and including a plurality of inorganic first layers numbering less than 50 in total and a plurality polymeric second layers numbering at least 20 in total. Each of the inorganic first and the polymeric second layers can have an average thickness of less than about 500 nm, such that for a substantially unpolarized substantially normally incident light, the optical film has an optical transmittance of greater than about 60% at the emitted wavelength and an optical reflectance of greater than about 70% at each of the second and third wavelengths.

These and other aspects will be apparent from the following detailed description. In no event, however, should this brief summary be construed to limit the claimable subject matter.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Backlights using a two-dimensional (2D) arrangement of mini/micro light emitting diodes (LEDs) for liquid crystal displays (LCDs) can be used as a competitive approach to organic light emitting diode (OLED) displays. Such 2D backlighting allows for significantly higher dynamic contrast ratio compared to conventional LCD displays by dimming LEDs in low brightness areas according to an approach called 2D zoning. In addition, down-conversion using light converting film(s) (e.g., containing phosphors and/or quantum dots) can be used to increase the color gamut of LCD display. An optical film that substantially transmits blue light and substantially reflects green and red light on-axis can be used to improve system efficiency and uniformity in such backlights by recycling green and red light emitted by the light converting film(s).

A multilayer optical film can include alternating high and low index optical layers to achieve optical reflectance in a desired wavelength range. Polyethylene naphthalate (PEN) is commonly used in multilayer optical films as the high index optical layers due to its high index contrast with polymethylmethacrylate (PMMA) which is commonly used as the low index optical layers in such films. However, PEN can suffer from light degradation and darkening, especially under blue light illumination, which limits its lifetime in application such as down-converting 2D backlights. To improve the lifetime of the optical film in down-converting 2D backlights, polyethylene terephthalate (PET) can be used as the high index optical layers. However, PET provides less refractive index contrast with the low index optical layers resulting in a drop in reflectance for green and red wavelengths (e.g., a drop of about 2-3%) which can result in a drop in device efficiency and brightness. An alternative to a PET-based multilayer optical film is a reflector that includes multiple inorganic layers to provide the desired reflection, but such reflectors are limited in thickness and number of layers and/or large areas due to mechanical constraints. However, it has been found that providing a reflector that includes at least some inorganic layers disposed on a (e.g., PET-based) polymeric multilayer reflector can provide improved reflectance for green and red wavelengths compared to PET-based multilayer optical films without the limitations of inorganic reflectors. For example, the PET-based film can reflect primarily in red and near-infrared wavelengths and the reflector that includes at least some inorganic layers can reflect primarily in green wavelengths such that the overall optical film can reflect throughout green and red wavelength ranges. According to some embodiments, it has been found that the optical films described herein can provide high device efficiency and on-axis brightness even when the transmittance of the optical film in a blue wavelength range is reduced (e.g., a reflectance in a blue wavelength range can be greater than 10 percent) compared to PEN-based multilayer optical films, for example. In addition, since the films include inorganic layers, the films can, according to some embodiments, provide a water and oxygen barrier to protect phosphor and quantum dot coatings from quenching over time, for example.

Figure 1A:
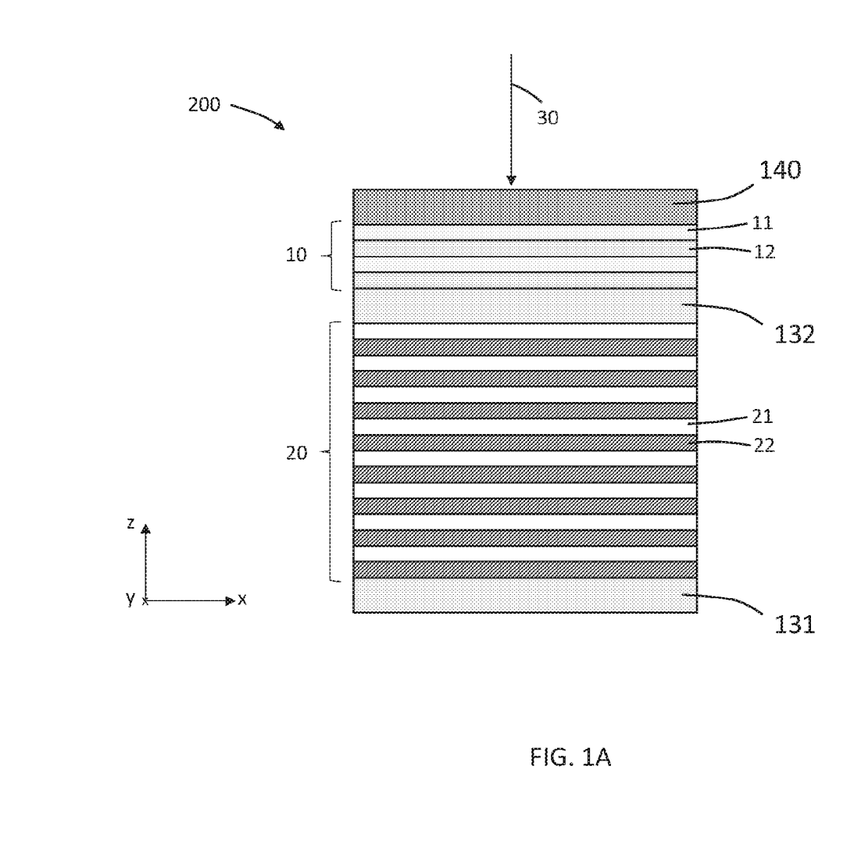
FIGS. 1A-1B are schematic cross-sectional views of multilayer optical films, according to some embodiments.
Figure 1B:
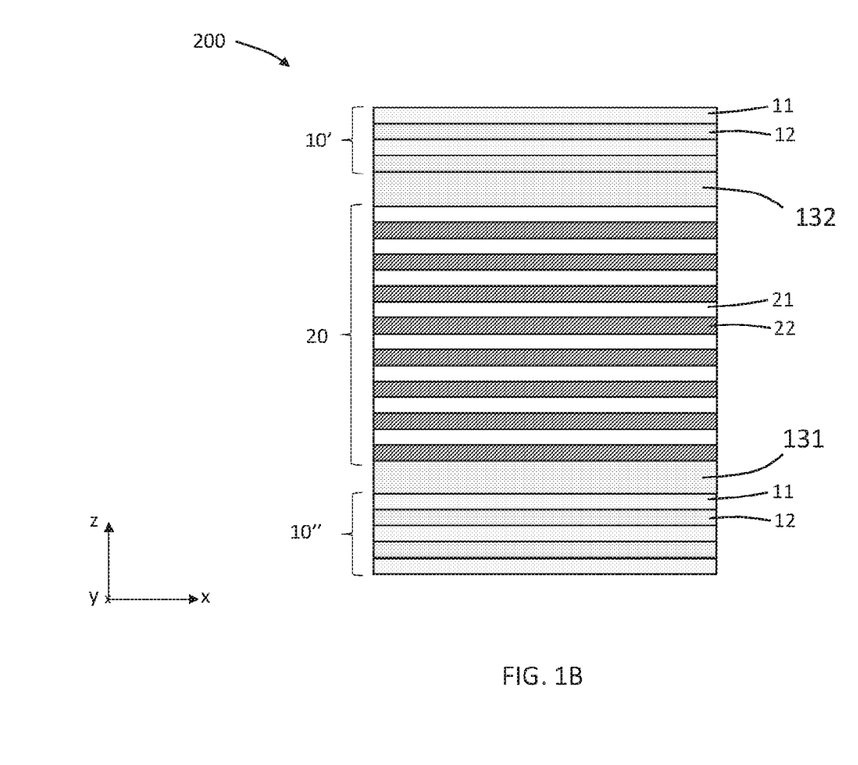

FIG. 1A is a schematic cross-sectional view of a multilayer optical film 200, according to some embodiments. FIG. 1B is a schematic cross-sectional view of the multilayer optical film 200, according to some other embodiments. In some embodiments, the optical film 200 includes a plurality 10 of first layers 11, 12 numbering N1 in total disposed on, and substantially coextensive in length and width with, a plurality 20 of polymeric second layers 21, 22 numbering N2 in total, where 2<N1<50, N2-N1>10, 20, 40, or 60. The first layers 11, 12 can number at least 3, 4, 6, 8, 10, 12, 15, or 20 in total, for example. The polymeric second layers 21, 22 can number at least 20, 30, 50, 75, 100, 150, or 200 in total, for example. The polymeric second layers 21, 22 can number less than about 600, 550, 500, or 450 in total, for example. Each of the first and second layers can have an average thickness of less than about 500, 400, 300, 250, or 200 nm. Each of the first and second layers can have an average thickness greater than about 3, 5, 10, 20, 40, or 50 nm, for example. For example, in some embodiments, at least some of the first layers are inorganic layers, and each inorganic layer has a thickness greater than about 3 or 5 nm and each polymeric layer has a thickness greater than about 40 or 50 nm. In some embodiments, each of at least 30%, or 40%, or 50%, or 60%, or 70%, or 80%, or 90%, or 100% of the first layers include at least 30%, or 40%, or 50%, or 60%, or 70%, or 80%, or 90%, or $_{95}$% by weight of an inorganic material. For example, each of at least 30% of the first layers can include at least 30% by weight of an inorganic material, or each of at least 40% of the first layers can include at least 60% by weight of an inorganic material, or each of the first layers can include at least 80% by weight of an inorganic material. In some embodiments, about half of the first layers are inorganic layers and about half or the first layers are polymeric layers. In other embodiments, each of the first layers are inorganic layers. Polymeric layers generally refer to layers composed primarily (e.g., greater than about 60, 70, 80, 90, or 95 weight percent) of organic polymer. Inorganic layers generally refer to layers composed primarily (e.g., greater than about 60, 70, 80, 90, or 95 weight percent) of inorganic material.

The plurality 10 of first layers 11, 12 can be disposed on a same side of the plurality 20 of second layers 21, 22 as schematically illustrated in FIG. 1A. Alternatively, a first portion 10' of the plurality 10 of first layers 11, 12 can be disposed on a first side of the plurality 20 of second layers 21, 22 and a different second portion 10" of the plurality 10 of first layers 11, 12 can be disposed on a second side of the plurality 20 of second layers 21, 22 opposite the first side as schematically illustrated in FIG. 1B. Using different portions 10', 10" of the plurality 10 of first layers 11, 12 on opposite sides of the of the plurality 20 of second layers 21, 22 can alter the coefficient of friction of the optical film with adjacent films and this may be beneficial when the optical film is used in a display system in contact with other films.

The plurality 20 of second layers 21, 22 can be formed by coextrusion and co-stretching as generally described in U.S. Pat. No. 5,882,774 (Jonza et al.); 6,783,349 (Neavin et al.); 6,949,212 (Merrill et al.); 6,967,778 (Wheatley et al.); and 9,162,406 (Neavin et al.), for example. The plurality 10 of first layers 11, 12 can then be formed on one or both sides of the plurality 10 of first layers 11, 12 via vapor deposition, for example. Suitable deposition methods are described in U.S. Pat. No. 5,440,446 (Shaw et al.); 5,877,895 (Shaw et al.); 6,010,751 (Shaw et al.); 6,413,645 (Graffet al.); 7,018,713 (Padiyath et al.); 9,997,657 (Weigel et al.); and 10,636,920 (Spagnola et al), for example. Alternatively, the plurality 10 of first layers 11, 12 can be formed on a separate substrate which is subsequently laminated to the plurality 10 of first layers 11, 12. The optical film 200 can optionally include other layers such as skin or protective boundary layers 131, 132 which may be coextruded with the plurality 20 of first layers 21, 22 and/or protective layer 140 which may be disposed on an outer surface of the plurality 10 of first layers 11, 12.

In some embodiments, an optical film 200 includes a plurality of layers (11, 12, 21, 22) numbering less than about 600, 550, 500, or 450 in total. The plurality of layers can number at least 10, 20, 50, or 100 in total, for example. The plurality of layers can include a plurality 10 of first layers 11, 12 numbering between 3 and 50, 45, 40, 35, 30, 25, or 20 (inclusive) in total disposed on a plurality 20 polymeric second layers 21, 22 numbering at least 20, 30, 50, 75, 100, 150, or 200 in total. For example, in some embodiments, the plurality 10 of first layers 11, 12 number between 3 and 50 in total and the plurality 20 polymeric second layers 21, 22 number at least 20 in total; or the plurality 10 of first layers 11, 12 number between 3 and 45 in total and the plurality 20 polymeric second layers 21, 22 number at least 50 in total; or the plurality 10 of first layers 11, 12 number between 3 and 40 in total and the plurality 20 polymeric second layers 21, 22 number at least 75 in total. In some embodiments, each of at least 30% (or in a range described elsewhere herein) of the first layers 11, 12 includes at least 30% by weight (or in a range described elsewhere herein) of an inorganic material. Each of the first and the polymeric second layers can have an average thickness of less than about 500 nm (or the average thickness can be in a range described elsewhere herein).

In some embodiments, the plurality 20 polymeric layers 21, 22 includes a plurality of alternating polymeric layers 21 (also referred to as second layers) and 22 (also referred to as third layers). The polymeric layers 21 may be polyethylene terephthalate (PET) layers and the polymeric layers 22 may be copolyester, polymethylmethacrylate (PMMA) layers, or blends of PMMA and other polymers such as polyvinylidene fluoride (PVDF), for example. In some embodiments, each of the layers 11, 12, 21, 22 comprises less than about 20, 15, 10, 5, 4, 3, 2, or 1 weight percent naphthalate groups. The polymeric layers 21 may be birefringent and the polymeric layers 22 may be substantially optically isotropic. The birefringent layers can have a maximum birefringence (e.g., absolute value of refractive index difference in x- and z-directions) at a first wavelength (e.g., 532 nm, 550 nm, or 633 nm) in a wavelength range of about 400 nm to about 700 nm of greater than about 0.05, 0.08, 0.1, 0.12, or 0.15, for example. The substantially isotropic layers can have a maximum birefringence at the first wavelength of less than about 0.025, 0.02, 0.015, 0.01, or 0.005, for example. The birefringent layers can have a refractive index along at least one direction greater than a refractive index of the substantially isotropic layers by at least about 0.05, 0.08, 0.1, 0.12, or 0.15, for example, for at least the first wavelength. The maximum difference in refractive indices between different layers along a same direction or between different directions in a same layer may be up to about 0.5, 0.4, or 0.3, for example, at the first wavelength. In some embodiments, the plurality 10 of first layers 11, 12 includes alternating polymeric (e.g., 11) and inorganic (e.g., 12) layers. The polymeric layers may be acrylate (e.g., PMMA) layers and the inorganic layers may be inorganic oxide (e.g., $Si_2O_2$, $TiO_2$ or $Nb_2O_5$) layers or metal (e.g., Ag) layers. The first layers 11, 12 may be substantially optically isotropic. Other useful materials are described in U.S. Pat. No. 5,882,774 (Jonza et al.); 6,783,349 (Neavin et al.); 6,949,212 (Merrill et al.); 6,967,778 (Wheatley et al.); 9,162,406 (Neavin et al.); 5,440,446 (Shaw et al.); 5,877,895 (Shaw et al.); 6,010,751 (Shaw et al.); 6,413,645 (Graffet al.); 7,018,713 (Padiyath et al.); 9,997,657 (Weigel et al.); and 10,636,920 (Spagnola et al.), for example.

In some embodiments, an optical film 200 includes a plurality 10 of first layers 11, 12 numbering between 3 and 50 in total (or in a range described elsewhere herein) disposed on a plurality alternating polymeric second (21) and polymeric third layers (22) numbering at least 20 in total (or in a range described elsewhere herein), where each of at least 30% (or in a range described elsewhere herein) of the first layers includes at least 30% (or in a range described elsewhere herein) by weight of an inorganic material. In some embodiments, each of the polymeric second layers 21 include at least 80% by weight of polyethylene terephthalate (PET). Each of the first, second and third layers can have an average thickness of less than about 500 nm (or in a range described elsewhere herein).

Figure 2:
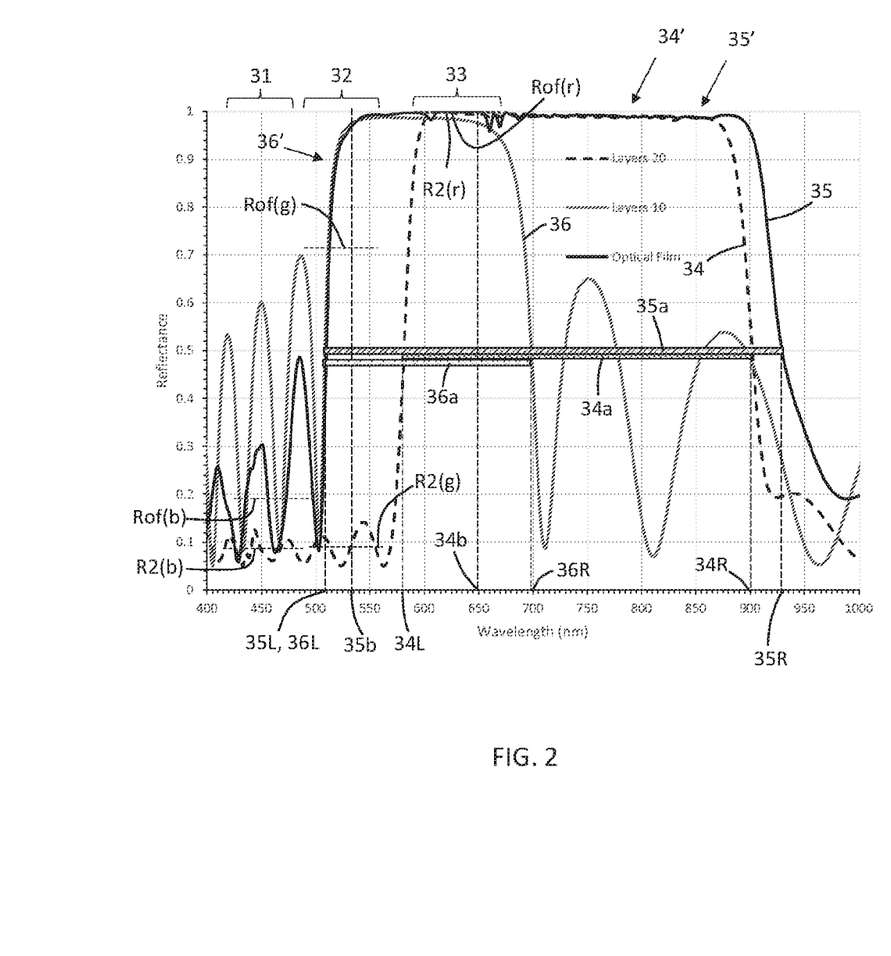
FIG. 2 is a plot of reflectance versus wavelength for pluralities of layers and for an optical film, according to some embodiments.

FIG. 2 is a plot of reflectance versus wavelength for the plurality 10 of layers 11, 12; for the plurality 20 of layers 21, 22; and for the optical film 200, according to some embodiments. An optical reflectance 36 of the plurality 10 of first layers 11, 12 versus wavelength comprises a reflection band 36'; an optical reflectance 34 of the plurality 20 of polymeric second layers 21, 22 versus wavelength comprises a reflection band 34'; and an optical reflectance 35 of the optical film 200 versus wavelength comprises a reflection band 35'. Average reflectances (expressed as a fraction—e.g., 0.994 is equivalent to 99.4%) for substantially unpolarized substantially normally incident light 30 for various wavelength ranges for the plurality 10 of layers 11, 12; for the plurality 20 of layers 21, 22; and for the optical film 200 of FIG. 2 are given in the following table.

| Wavelength | Average Reflectance | | |
|---|---|---|---|
| Range (nm) | Plurality 20 of Layers 21, 22 | Plurality 10 of Layers 11, 12 | Optical Film |
| 420-480 | 0.086 | 0.378 | 0.189 |
| 490-560 | 0.093 | 0.791 | 0.733 |
| 590-670 | 0.986 | 0.978 | 0.994 |

-continued

| Wavelength Range (nm) | Average Reflectance | | |
|---|---|---|---|
| | Plurality 20 of Layers 21, 22 | Plurality 10 of Layers 11, 12 | Optical Film |
| 500-570 | 0.092 | 0.852 | 0.832 |

In some embodiments, the optical film 200 is such that for a substantially normally incident light 30, a blue wavelength range 31 extending from about 420 nm to about 480 nm, a green wavelength range 32 extending from about 490 nm to about 560 nm, and a red wavelength range 33 extending from about 590 nm to about 670 nm, the optical film 200 and the plurality 20 of polymeric second layers 21, 22 have respective average optical reflectances Rof(b) and R2(b) in the blue wavelength range, Rof(g) and R2(g) in the green wavelength range, and Rof(r) and R2(r) in the red wavelength range. In some embodiments, 0≤Rof(b)–R2(b) 25, 20, or 15%. In some such embodiments, or in other embodiments, 2, 3, 5, 7, or 9%≤Rof(b)–R2(b). In some such embodiments, or in other embodiments, Rof(g)–R2(g)>30, 35, 40, 45, 50, 55, or 60%. In some such embodiments, or in other embodiments, each of Rof(r) and R2(r) is greater than about 60, 65, 70, 75, 80, 85, 90, or 95% and a magnitude of a difference between Rof(r) and R2(r) is less than about 20, 15, 10, 5, 4, 3, 2, or 1%. For example, in some embodiments, each of Rof(r) and R2(r) is greater than about 60% and a magnitude of a difference between Rof(r) and R2(r) (i.e., |Rof(r) –R2(r)|) is less than about 20%; or each of Rof(r) and R2(r) is greater than about 65% and a magnitude of a difference between Rof(r) and R2(r) is less than about 15%; or each of Rof(r) and R2(r) is greater than about 70% and a magnitude of a difference between Rof(r) and R2(r) is less than about 10%; or each of Rof(r) and R2(r) is greater than about 75% and a magnitude of a difference between Rof(r) and R2(r) is less than about 5%; or each of Rof(r) and R2(r) is greater than about 80% and a magnitude of a difference between Rof(r) and R2(r) is less than about 4%; or each of Rof(r) and R2(r) is greater than about 85% and a magnitude of a difference between Rof(r) and R2(r) is less than about 3%; or each of Rof(r) and R2(r) is greater than about 90% and a magnitude of a difference between Rof(r) and R2(r) is less than about 2%; or each of Rof(r) and R2(r) is greater than about 95% and a magnitude of a difference between Rof(r) and R2(r) is less than about 1%. In some embodiments, 0≤Rof(b)–R2(b)≤20%, Rof(g)–R2(g)>50%, and each of Rof(r) and R2(r) is greater than about 80% and a magnitude of a difference between Rof(r) and R2(r) is less than about 5%; or 0≤Rof(b)–R2(b) 15%, Rof(g)–R2(g)>60%; and each of Rof(r) and R2(r) is greater than about 90% and a magnitude of a difference between Rof(r) and R2(r) is less than about 3%. In some embodiments, Rof(b) is in a range of about 10 to 30% or about 15 to 25%.

In some embodiments, the optical film 200 is such that for a substantially unpolarized (e.g., a degree of polarization of less than 30, 20, 10, or 5%) substantially normally incident (e.g., incident to within 30, 20, 10, or 5 degrees of normal) light 30: an optical reflectance 34 of the polymeric second layers 21, 22 versus wavelength comprises a first reflection band 34' having a first full width at half maximum FWHM1 34a that is at least 100 nm wide and comprises at least one wavelength 34b in a red wavelength range 33 extending from about 590 nm to about 670 nm, but no wavelengths in a green wavelength range 32 extending from about 490 nm to about 560 nm, where the plurality of first layers 11, 12 extend the FWHM1 so that the optical film 200 has a second reflection band 35' comprising a second full width at half maximum FWHM2 35a greater than FWHM1 by at least 20 nm and including at least one wavelength 35b in the green wavelength range. In some embodiments, the FWHM1 34a is at least 100, 125, 150, 175,200, 225, 250, 275, or 300 nm. In some such embodiments, or in other embodiments, FWHM2 35a is greater than FWHM1 34a by at least 20, 30, 40, 50, 60, 70, 80, 90, or 100 nm. FWHM2 35a can be greater than FWHM1 34a by up to about 250, 200, or 150 nm, for example. In some embodiments, the optical film 200 and the plurality of second layers 21, 22 have respective average optical reflectances Rof(r) and R2(r) in the red wavelength range, where a magnitude of a difference between Rof(r) and R2(r) less than about 3, 2.5, 1, 1.5, or 1%. Rof(r) and R2(r) can be in any of the ranges described elsewhere herein. For example, in some embodiments, Rof (r) and R2(r) are each greater than 85%.

In some embodiments, the optical film 200 is such that for a substantially unpolarized substantially normally incident light 30: optical reflectances of the optical film (35), the plurality of first layers (36), and the plurality of alternating polymeric second and polymeric third layers (34) have respective first, second, and third reflection bands 35', 36', and 34' comprising respective first (35a), second (34a), and third (36a) full width at half maxima that extend between respective smaller wavelengths (35L, 34L, 36L) and respective larger wavelengths (35R, 34R, 36R), where each of the first, second, and third full width at half maxima is at least 50, 75, 100, 125, 150, 175, or 200 nm wide. In some embodiments, a magnitude of a difference between the smaller wavelengths (35L, 36L) of the first and third full width at half maxima is less than about 20, 15, 10, or 5 nm. In some such embodiments, or in other embodiments, the smaller wavelength 36L of the third full width at half maxima 36a is less than the smaller wavelength 34L of the second full width at half maxima 34a by at least 20, 30, 40, or 50 nm. In some such embodiments, or in other embodiments, the larger wavelength 35R of the first full width at half maxima 35a is greater than the larger wavelength 34R of the second full width at half maxima 34a by at least 5, 10, 15, 20, 25, 30, 35, or 40 nm. The smaller wavelength 36L of the third full width at half maxima 36a can be less than the smaller wavelength 34L of the second full width at half maxima 34a by up to about 200, 150, or 100 nm, for example. The larger wavelength 35R of the first full width at half maxima 35a can be greater than the larger wavelength 34R of the second full width at half maxima 34a by up to about 150, 100, or 75 nm, for example.

Figure 3:
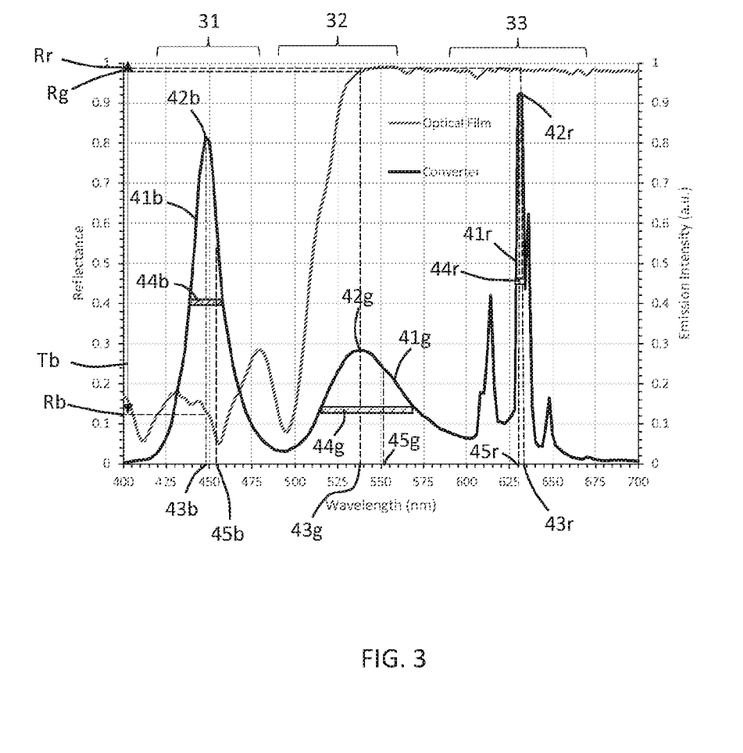
FIG. 3 is a plot of reflectance for the optical film of FIG. 2 and an emission intensity of one or more light converting films versus wavelength, according to some embodiments.
Figure 4:
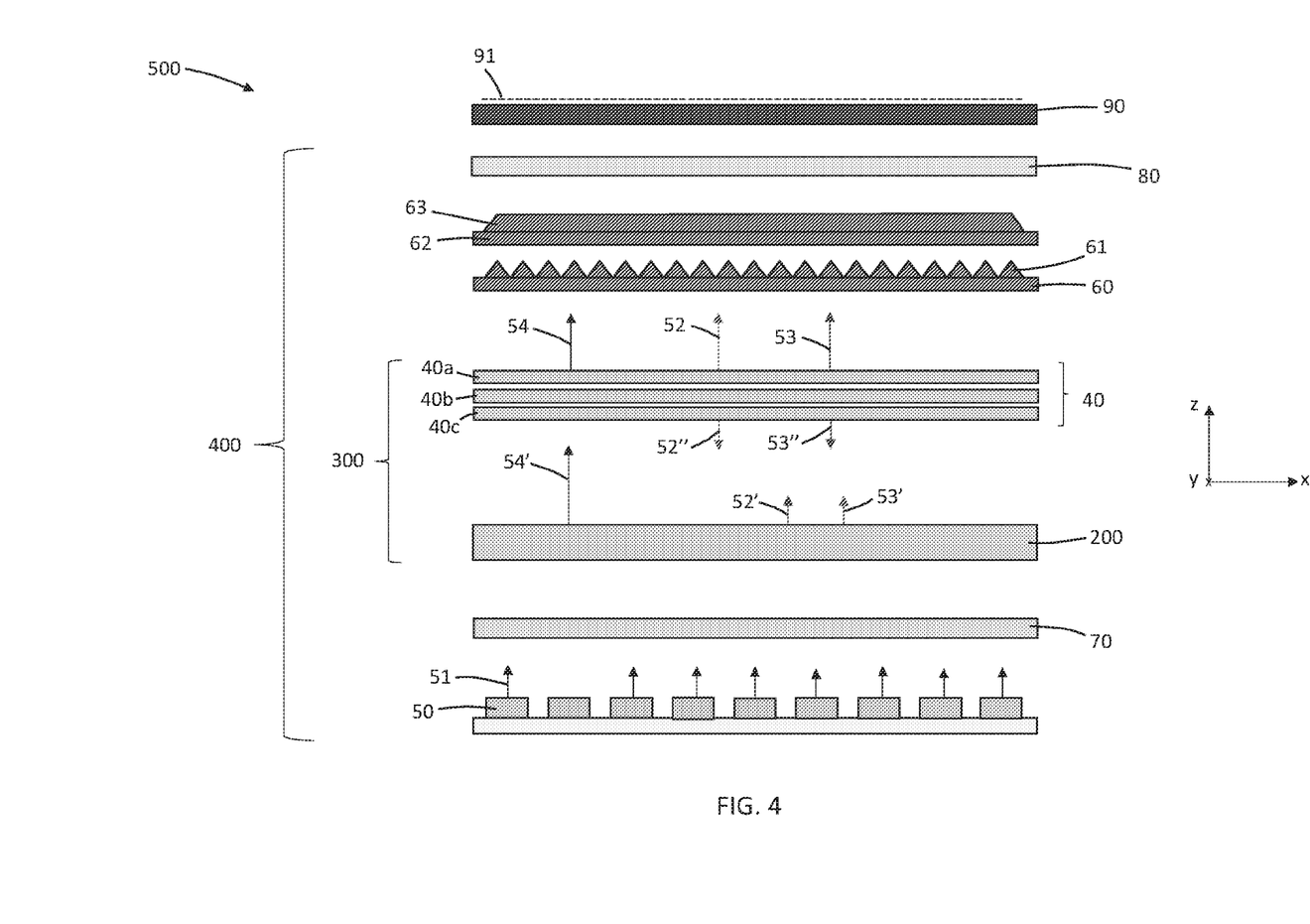
FIG. 4 is a schematic exploded cross-sectional view of a display system including a backlight that includes an optical stack including an optical film 200 disposed on one or more light converting films, according to some embodiments.

FIG. 3 is a plot of reflectance for the optical film 200 and an emission intensity of one or more light converting films versus wavelength, according to some embodiments. FIG. 4 is a schematic exploded cross-sectional view of a display system 500 including a backlight 400 that includes an optical stack 300 including an optical film 200 disposed on one or more light converting films 40, according to some embodiments. The one or more light converting films 40 incudes light converting films 40a, 40b, and 40c in the illustrated embodiment. The light converting films 40a, 40b, and 40c may include quantum dots or phosphorus, for example. Suitable light converting films are known in the art and include Quantum Dot Enhancement Film (QDEF) available from 3M Company (St. Paul, MN). The backlight 400 is for providing illumination (e.g., light 52, 53, 54) to a display panel 90 configured to display an image 91. The optical film 200 may substantially transmit blue light (e.g., light 51, 54' which may have a wavelength 43b) and may substantially reflect green and red light (e.g., light 52', 53' which may have respective wavelengths 43g and 43b) emitted (e.g., light 52", 53") by the one or more light converting films 40 toward the optical film 200.

In some embodiments, an optical stack 300 includes one or more light converting films 40, 40a having a blue emission spectrum 41b including at least one blue peak 42b at a corresponding blue wavelength 43b, a green emission spectrum 41g including at least one green peak 42g at a corresponding green wavelength 43g, and a red emission spectrum 41r including at least one red peak 42r at a corresponding red wavelength 43r. The optical stack can include an optical film 200 disposed on, and substantially coextensive in length and width with, the one or more light converting films 40. In some embodiments, the optical film 200 includes a plurality of inorganic first layers (e.g., layers 11, or layers 12, or layers 11 and 12) numbering at least 3 in total (or in a range described elsewhere herein) and a plurality polymeric second layers 21, 22 numbering at least 20 in total (or in a range described elsewhere herein). In some embodiments, each of the inorganic first and the polymeric second layers have an average thickness of less than about 500 nm (or in a range described elsewhere herein), such that for a substantially unpolarized substantially normally incident light 30, the optical film 200 has an optical transmittance Tb of greater than about 60% at the blue wavelength and an optical reflectance Rg, Rr of greater than about 70% at each of the green and red wavelengths. In some such embodiments, or in other embodiments, the optical transmittance Tb is greater than about 60, 65, 70, 75, 80, or 85% at the blue wavelength 43b. In some such embodiments, or in other embodiments, the optical reflectance Rg, Rr is greater than about 70, 75, 80, 85, 90, or 95% at each of the green and red wavelengths 43g and 43r. For example, in some embodiments, the optical transmittance Tb of the optical film 200 is greater than about 70% at the blue wavelength 43b and the optical reflectance Rg, Rb of the optical film is greater than about 80% at each of the green and red wavelengths 43g and 43r; or the optical transmittance Tb of the optical film 200 is greater than about 75% at the blue wavelength 43b and the optical reflectance Rg, Rb of the optical film is greater than about 85% at each of the green and red wavelengths 43g and 43r; or the optical transmittance Tb of the optical film 200 is greater than about 80% at the blue wavelength 43b and the optical reflectance Rg, Rb of the optical film is greater than about 95% at each of the green and red wavelengths 43g and 43r.

In some embodiments, the backlight 400 is for providing illumination to a display panel 90 configured to display an image 91. In some embodiments, the backlight 400 includes: a plurality of light emitting elements 50 arranged two-dimensionally (e.g., in the xy-plane) and spaced apart from each other and configured to emit light 51 having an emitted wavelength (e.g., a blue wavelength such as 45b or an ultraviolet wavelength); one or more light converting films 40 disposed on the light emitting elements and having first (41b), second (41g) and third (41r) emission spectra including respective first (42b), second (42g) and third (42r) peaks at corresponding respective first (43b), second (43g) and third (43r) peak wavelengths and corresponding non-overlapping first (44b), second (44g), and third (44r) full width at half maxima (FWHMs), where the second FWHM is disposed between the first and third FWHM. The one or more light converting films is configured to receive the emitted light 51 from the light emitting elements and convert at least portions of the received emitted light to second (52) and third (53) lights having respective second (45g) and third (45r) wavelengths disposed in the respective second and third FWHMs. In some embodiments, the one or more light converting films is further configured to convert at least portions of the received emitted light to a first light 54 having a first wavelength 45b wavelength disposed in the first FWHM. In some embodiments, the first, second and third FWHMs are at least 10, 20, 30, 40, 50, 60, 70, 80, 90, or 100 nm apart. The first, second and third FWHMs may each be disposed in a range from about 400 nm to about 700 nm, for example. The backlight 400 includes an optical film 200 disposed between the light emitting elements 50 and the one or more light converting films 40 and includes a plurality of inorganic first layers (11 and/or 12) numbering less than 50, 45, 40, 35, 30, 25, 20, 15, or 10 in total (or in a range described elsewhere herein) and a plurality polymeric second layers (21, 22) numbering at least 20 in total (or in a range described elsewhere herein). The inorganic layers may number at least 3, 4, 6, 8, 10, 12, 15, or 20 in total. Each of the inorganic first and the polymeric second layers can have an average thickness of less than about 500 nm (or in a range described elsewhere herein), such that for a substantially unpolarized substantially normally incident light 30, the optical film 200 has an optical transmittance of greater than about 60% at the emitted wavelength and an optical reflectance of greater than about 70, 75, 80, 85, 90, or 95% at each of the second and third wavelengths. The optical film 200 can have an optical transmittance of greater than about 65, 70, 75, 80, or 85% at the emitted wavelength.

In some embodiments, the backlight 400 further includes a first prismatic film 60 disposed on the one or more light converting films 40 opposite the optical film 200 and including a plurality of first prisms 61 extending along a first longitudinal direction (y-direction). In some embodiments, the backlight 400 further includes a second prismatic film 62 disposed on the first prismatic film 60 opposite the optical film 200 and including a plurality of second prisms 63 extending along a second longitudinal direction (x-direction) different than the first longitudinal direction. The first and second longitudinal directions can be substantially orthogonal, for example. Suitable prism films are known in the art and are described in U.S. Pat. No. 5,932,626 (Fong et al.); 6,280,063 (Fong et al.); 7,622,164 (Jones et al.); and 9,423,553 (Saito), for example.

In some embodiments, the backlight 400 further includes an optical diffuser 70 disposed between the optical film 200 and the light emitting elements 50 and configured to receive and scatter the emitted light 51. Suitable diffusers are known in the art and include bulk diffusers (e.g., having beads dispersed in a matrix) and surface diffusers (e.g., having a microreplicated surface configured to scatter light), for example.

In some embodiments, the backlight further includes a reflective polarizer 80, where the one or more light converting films 40 is disposed between the reflective polarizer 80 and the optical film 200. The reflective polarizer 80 can be a multilayer optical film and can generally correspond to layers 21, 22. In some embodiments, the reflective polarizer includes a plurality of polymeric third layers (e.g., corresponding to layers 21, 22) numbering at least 10, 20, 50, 75, 100, 150, 200, 250, 300, or 400 in total, where each of the polymeric third layers has an average thickness of less than about 500, 400, 350, 250, or 200 nm, such that for a substantially normally incident light 30, the plurality of polymeric third layers reflects more than about 60% of the incident light having the in-plane first polarization state (e.g., polarized along the x-axis) and transmits more than about 60% of the incident light having an in-plane orthogonal second polarization state (e.g., polarized along the y-axis). In some embodiments, the plurality of polymeric third layers reflects more than about 70%, or 80%, or 90% of the incident light having the in-plane first polarization state. In some such embodiments, or in other embodiments, the plurality of polymeric third layers transmits more than about 70%, or 80%, or 90% of the incident light having the in-plane second polarization state. Suitable reflective polarizers are described in U.S. Pat. No. 5,882,774 (Jonza et al.); 6,783,349 (Neavin et al.); 6,949,212 (Merrill et al.); 6,967,778 (Wheatley et al.); and 9,162,406 (Neavin et al.), for example, and include those available from 3M Company under the tradenames DBEF and APF, for example.

In some embodiments, a display system 500 includes a display panel 90 disposed on the backlight 400 and configured to receive at least the second and third lights 52 and 53 and form an image 91. The display panel 90 typically also receives the first light 54. The display panel 90 can be a liquid crystal display (LCD) panel, for example. The display system 500 may be configured to utilize 2D zoning to provide a high dynamic contrast ratio.

The following table provides average reflectance (Ravg) for normally incident unpolarized light in a wavelength range of 525 nm to 825 nm for various optically modeled films. The materials of the high index optical (HIO) layers and low index optical (LIO) layers for the plurality 10 of layers 11, 12 and the plurality 20 of layers 21, 22 are indicated. The plurality 20 of layers 21, 22 included 424 layers; the numbers of layers in the plurality 10 of layers 11, 12 are indicated in the table. Known refractive indices of the materials of the various layers were used in the optical modeling. The acrylate of film numbers 3-6 was modeled as having a refractive index of about 1.529 at 550 nm. Film numbers 3, 4 and 7-10 included all layers of the plurality 10 of layers 11, 12 disposed on one side of the plurality 20 of layers 21, 22. Film number 11 included 10 layers of the plurality 10 of layers 11, 12 on each side of the plurality 20 of layers 21, 22. PVDF30 used in film number 12 was a blend of 30 weight percent PVDF in PMMA. PVDF can be used to lower the refractive index of the PMMA layers. However, in some cases, it may be preferred that the optical film not include fluorinated polymers such as PVDF.

| Film No. | Plurality 20 of Layers 21, 22 | | Plurality 10 of Layers 11, 12 | | No. Layers | Ravg 525-825 nm |
|---|---|---|---|---|---|---|
| | HIO | LIO | HIO | LIO | | |
| 1 | PEN | PMMA | — | — | 0 | 99.93% |
| 2 | PET | PMMA | — | — | 0 | 96.81% |
| 3 | PET | PMMA | Nb2O5 | Acrylate | 14 | 98.82% |
| 4 | PET | PMMA | Nb2O5 | Acrylate | 16 | 99.02% |
| 5 | — | — | Nb2O5 | Acrylate | 60 | 99.15% |
| 6 | — | — | Nb2O5 | Acrylate | 90 | 99.68% |
| 7 | PET | PMMA | Ag | PMMA | 3 | 97.24% |
| 8 | PET | PMMA | Ag | PMMA | 3 | 97.17% |
| 9 | PET | PMMA | Ag | PMMA | 3 | 98.31% |
| 10 | PET | PMMA | TiO2 | SiO2 | 20 | 99.44% |
| 11 | PET | PMMA | TiO2 | SiO2 | 20 | 99.09% |
| 12 | PET | PVDF30 | — | — | — | 99.14% |

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially" with reference to a property or characteristic is not otherwise clear to one of ordinary skill in the art in the context in which it is used and described in the present description and when it would be clear to one of ordinary skill in the art what is meant by an opposite of that property or characteristic, the term "substantially" will be understood to mean that the property or characteristic is exhibited to a greater extent than the opposite of that property or characteristic is exhibited.

Layers or elements can be described as substantially coextensive with each other in length and width if greater than 50% of the length and width of each layer or element is co-extensive with greater than 50% of the length and width of each other layer or element. In some embodiments, for layers or elements described as substantially coextensive with each other in length and width, at least about 60%, or at least about 70%, or at least about 80%, or at least about 90% of each layer or element is co-extensive in length and width with at least about 60%, or at least about 70%, or at least about 80%, or at least about 90% of the length and width of each other layer or element.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. A multilayer optical film comprising a plurality of first layers numbering N1 in total disposed on, and substantially coextensive in length and width with, a plurality of polymeric second layers numbering N2 in total, 2<N1<50, N2−N1>10, each of the first and second layers having an average thickness of less than about 500 nm, each of at least 30% of the first layers comprising at least 30% by weight of an inorganic material, such that for a substantially normally incident light, a blue wavelength range extending from about 420 nm to about 480 nm, a green wavelength range extending from about 490 nm to about 560 nm, and a red wavelength range extending from about 590 nm to about 670 nm, the optical film and the plurality of polymeric second layers have respective average optical reflectances Rof(b) and R2(b) in the blue wavelength range, Rof(g) and R2(g) in the green wavelength range, and Rof(r) and R2(r) in the red wavelength range, wherein:

0≤Rof(b)−R2(b)≤25%;

Rof(g)−R2(g)>30%; and each of Rof(r) and R2(r) is greater than about 60% and a magnitude of a difference between Rof(r) and R2(r) is less than about 20%.

2. The multilayer optical film of claim 1, wherein each of at least 40% of the first layers comprises at least 60% by weight of an inorganic material.

3. The multilayer optical film of claim 1, wherein:

0≤Rof(b)−R2(b)≤20%;

Rof(g)−R2(g)>50%; and each of Rof(r) and R2(r) is greater than about 80% and a magnitude of a difference between Rof(r) and R2(r) is less than about 5%.

4. An optical stack comprising:

one or more light converting films comprising a blue emission spectrum comprising at least one blue peak at a corresponding blue wavelength, a green emission spectrum comprising at least one green peak at a corresponding green wavelength, and a red emission spectrum comprising at least one red peak at a corresponding red wavelength; and an optical film disposed on, and substantially coextensive in length and width with, the one or more light converting films, the optical film comprising a plurality of inorganic first layers numbering at least 3 in total and a plurality of polymeric second layers numbering at least 20 in total, each of the inorganic first and the polymeric second layers having an average thickness of less than about 500 nm, such that for a substantially unpolarized substantially normally incident light, the optical film has an optical transmittance of greater than about 60% at the blue wavelength and an optical reflectance of greater than about 70% at each of the green and red wavelengths.

5. The optical stack of claim 4, wherein the optical transmittance of the optical film is greater than about 70% at the blue wavelength and the optical reflectance of the optical film is greater than about 80% at each of the green and red wavelengths.

6. An optical film comprising a plurality of layers numbering less than about 600 in total, the plurality of layers comprising a plurality of first layers numbering at least 3 in total disposed on a plurality of polymeric second layers numbering at least 20 in total, each of at least 30% of the first layers comprising at least 30% by weight of an inorganic material, each of the first and the polymeric second layers having an average thickness of less than about 500 nm, such that for a substantially unpolarized substantially normally incident light:

an optical reflectance of the polymeric second layers versus wavelength comprises a first reflection band comprising a first full width at half maximum FWHM1 that is at least 100 nm wide and comprises at least one wavelength in a red wavelength range extending from about 590 nm to about 670 nm, but no wavelengths in a green wavelength range extending from about 490 nm to about 560 nm, the plurality of first layers extending the FWHM1 so that the optical film has a second reflection band comprising a second full width at half maximum FWHM2 greater than FWHM1 by at least 20 nm and including at least one wavelength in the green wavelength range, wherein the optical film and the plurality of second layers have respective average optical reflectances Rof(r) and R2(r) in the red wavelength range, a magnitude of a difference between Rof(r) and R2(r) less than about 3%.

7. The optical film of claim 6, wherein Rof(r) and R2(r) are each greater than 85%.

8. An optical film comprising a plurality of first layers numbering between 3 and 50 in total disposed on a plurality alternating polymeric second and polymeric third layers numbering at least 20 in total, each of at least 30% of the first layers comprising at least 30% by weight of an inorganic material, each of the polymeric second layers having at least 80% by weight of polyethylene terephthalate, each of the first, second and third layers having an average thickness of less than about 500 nm, such that for a substantially unpolarized substantially normally incident light:

optical reflectances of the optical film, the plurality of first layers, and the plurality of alternating polymeric second and polymeric third layers comprise respective first, second, and third reflection bands comprising respective first, second, and third full width at half maxima that extend between respective smaller wavelengths and respective larger wavelengths, wherein, each of the first, second, and third full width at half maxima is at least 50 nm wide, and wherein:

a magnitude of a difference between the smaller wavelengths of the first and third full width at half maxima is less than about 20 nm;

the smaller wavelength of the third full width at half maxima is less than the smaller wavelength of the second full width at half maxima by at least 20 nm; and the larger wavelength of the first full width at half maxima is greater than the larger wavelength of the second full width at half maxima by at least 5 nm.

9. A backlight for providing illumination to a display panel configured to display an image, the backlight comprising:

a plurality of light emitting elements arranged two-dimensionally and spaced apart from each other and configured to emit light having an emitted wavelength;

one or more light converting films disposed on the light emitting elements and comprising first, second and third emission spectra comprising respective first, second and third peaks at corresponding respective first, second and third peak wavelengths and corresponding non-overlapping first, second, and third full width at half maxima (FWHMs), the second FWHM disposed between the first and third FWHM, the one or more light converting films configured to receive the emitted light from the light emitting elements and convert at least portions of the received emitted light to second and third lights having respective second and third wavelengths disposed in the respective second and third FWHMs; and an optical film disposed between the light emitting elements and the one or more light converting films and comprising a plurality of inorganic first layers numbering less than 50 in total and a plurality of polymeric second layers numbering at least 20 in total, each of the inorganic first and the polymeric second layers having an average thickness of less than about 500 nm, such that for a substantially unpolarized substantially normally incident light, the optical film has an optical transmittance of greater than about 60% at the emitted wavelength and an optical reflectance of greater than about 70% at each of the second and third wavelengths.

10. The backlight of claim 9, wherein the one or more light converting films is further configured to convert at least portions of the received emitted light to a first light having a first wavelength disposed in the first FWHM.

11. The backlight of claim 9, wherein the first, second and third FWHMs are at least 10 nm apart.

12. The backlight of claim 9 further comprising a first prismatic film disposed on the one or more light converting films opposite the optical film and comprising a plurality of first prisms extending along a first longitudinal direction.

13. The backlight of claim 12 further comprising a second prismatic film disposed on the first prismatic film opposite the optical film and comprising a plurality of second prisms extending along a second longitudinal direction different than the first longitudinal direction.

14. The backlight of claim 9 further comprising a reflective polarizer, the one or more light converting films disposed between the reflective polarizer and the optical film, the reflective polarizer comprising a plurality of polymeric third layers numbering at least 10 in total, each of the polymeric third layers having an average thickness of less than about 500 nm, such that for a substantially normally incident light, the plurality of polymeric third layers reflects more than about 60% of the incident light having the in-plane first polarization state and transmits more than about 60% of the incident light having an in-plane orthogonal second polarization state.

15. A display system comprising a display panel disposed on the backlight of claim 9 and configured to receive at least the second and third lights and form an image.

\* \* \* \* \*